United States Patent [19]

Oishi

[11] Patent Number: 4,742,415

[45] Date of Patent: May 3, 1988

[54] MAGNETIC TAPE CASSETTE HAVING A GUIDED REEL BRAKE PAWL

[75] Inventor: Kengo Oishi, Kanagawa, Japan

[73] Assignee: Fuji Photo Film Co., Ltd., Kanagawa, Japan

[21] Appl. No.: 860,387

[22] Filed: May 6, 1986

[30] Foreign Application Priority Data

May 8, 1985 [JP] Japan ............................... 60-66847[U]

[51] Int. Cl.$^4$ ...................... G11B 23/02; G11B 15/32
[52] U.S. Cl. ..................................... 360/132; 242/198
[58] Field of Search ............................. 360/132, 134; 242/198–199

[56] References Cited

U.S. PATENT DOCUMENTS

| | | |
|---|---|---|
| 4,473,202 | 9/1984 | Verhoeven .......................... 242/198 |
| 4,553,717 | 11/1985 | Takagi ................................. 242/198 |
| 4,579,295 | 4/1986 | Harada .......................... 360/132 X |
| 4,604,671 | 8/1986 | Oishi .................................... 360/132 |
| 4,607,307 | 8/1986 | Sieben ................................. 360/132 |
| 4,631,619 | 12/1986 | Hashizume et al. ................. 360/132 |
| 4,635,878 | 1/1987 | Didriksen ........................... 242/198 |
| 4,650,136 | 3/1987 | Tsuruta .............................. 242/199 |

Primary Examiner—John H. Wolff
Attorney, Agent, or Firm—Sughrue, Mion, Zinn, Macpeak, and Seas

[57] ABSTRACT

A brake mechanism for a tape cassette in which a brake member having two pawls is slidable to engage the pawls with tooth portions of the two tape reels. The brake member and the cassette case have a groove and a matching rib fitted into the groove, both of which extend in the sliding direction, so as to reduce the side play of the sliding brake member.

6 Claims, 2 Drawing Sheets

MAGNETIC TAPE CASSETTE HAVING A GUIDED REEL BRAKE PAWL

BACKGROUND OF THE INVENTION

1. Field of the Invention

The present invention relates generally to a magnetic tape cassette. In particular, it relates to a magnetic tape cassette having a sliding brake for preventing wound tape reels from accidentally rotating.

2. Background Art

There are various types of magnetic tape cassettes, for example, audio tape cassettes, video tape cassetttes, etc. In a video tape cassette, generally, there is provided a brake mechanism for preventing tape reels from accidentally rotating. This brake member is necessary to prevent difficulties, such as looseness in winding of a magnetic tape, jamming of the tape due to this looseness, or the like, both in the storage the cassette outside the player and its carrying. Particularly, a video tape cassette which is widely used is arranged such that in use a magnetic tape is exposed at the front of the cassette so that looseness in winding of the tape or the like may cause various kinds of difficulty. Accordingly, the brake has a significant role.

Although there has been proposed various brake mechanisms having a variety of structures, a brake member to which the present invention is applied is arranged such that, as shown in FIG. 1, a pair of engaging pawls 23 open from a frontal side surface of a block 21 of the brake member at a predetermined angle. The pawls 23 are made of a plastic material, for example, POM resin, or the like, and are elastic to a certain extent. That is, although the pawls 23 are fixed to the block at the fixed angle, they can bend to a certain extent. Further, as shown in FIG. 2, a brake releasing bar 14, to be described later, is selectively inserted into a recess portion 25 formed in the block 21 in its bottom surface.

The thus arranged brake member 20 is disposed on a central portion of the rear of a cassette casing 10. The side from which a magnetic tape is taken out is referred to as "front". In the portion of the cassette where the brake member 20 is disposed, there are provided a pair of partition walls 16 (FIG. 1) connected with a casing side wall 15 for restricting to a certain degree the displacement of the block 21 in the right or left direction (hereinafter referred to as the "longitudinal direction"). A pair of cylindrical choke pins 7 project outside the engaging pawls 23, respectively. A brake releasing bar insertion through-hole 9 (FIG. 2) is formed in the cassette case 10 generally beneath the block 21 and between the partition walls 16. The brake member 20 is arranged to be urged toward the front of the cassette by a coil spring 6 provided behind the brake member 20.

In each of a pair of tape reels 11 (FIG. 2) around which a magnetic tape is wound, a ratchet tooth portion 13 is formed at the outer peripheral edge of a lower flange 12 of two flanges so that each of the tape reels 11 is prevented from rotating by a selective engagement between the engaging pawl 23 and the tooth portion 13.

When the video tape cassette shown in FIG. 2 is loaded in a recording/reproducing apparatus, the brake releasing bar 14 comes into the cassette through the insertion hole 9 and the brake member 20 is displaced toward the rear of the casing (in the direction of an arrow A). This displacement causes both the engaging pawls 23 to move. As a result, the respective free end portions of the pawls 23 gradually move closer to each other by the guidance of the respective choke pins 7. Thus the pawls 23 separate from the respective tooth portions 13 to thereby allow the tape reels 11 to rotate.

In thus arranged conventional brake member 20, however, there arises a problem, which will now be described. In the assembly of the brake member 20 into the cassette casing, it is preferable to provide a gap of a certain size between the block 21 and each partition wall 16. During storage of the cassette, however, the brake member 20 may become inclined or offset in the longitudinal direction of the cassette by an amount corresponding the size of the gap by the urging force of the coil spring 6. As a result, the state of insertion of the engaging pawls 23 into the tooth portions 13 (strength of abutment therebetween) becomes unbalanced and, in an extreme case, one of the engaging pawls 23 will not engage with the associated tooth portion 13. Further, in the case where the size of the gap is selected to be larger, the positions of the respective forward portions of the engaging pawls 23 are not well defined so that in a brake-released state there has been a risk of occurrence of undesirable contact between any one of the engaging pawls 23 with the associated tooth portion 13. Specifically, in a cassette which is reduced in size and weight, it is necessary to reduce the amount of insertion of the respective engaging pawls 23 into the tooth portions 13 and therefore the foregoing problem has been further intensified.

SUMMARY OF THE INVENTION

A general object of the present invention is to solve the foregoing problem.

In particular, an object of the present invention is to provide a magnetic tape cassette provided with a brake member which is improved so as to dependably lock and unlock the tape reels.

The object of the present invention can be achieved by a magnetic tape cassette having a pair of tape reels for winding a magnetic tape therearound. Each of the tape reels is provided with a tooth portion formed at an outer peripheral edge of a flange thereof. A slidable brake member has a pair of engaging pawls for engaging the tooth portions of the respective reels. According to the invention, at least one groove is formed in at least one of the upper and lower wall surfaces of a block body of the brake member and extends in the sliding direction of the slidable brake member. A guide rib extends in the sliding direction of the brake member and projects from an inner wall surface of a cassette casing so as to be fitted into the groove.

DETAILED DESCRIPTION OF THE PREFERRED EMBODIMENTS

Figure 1:
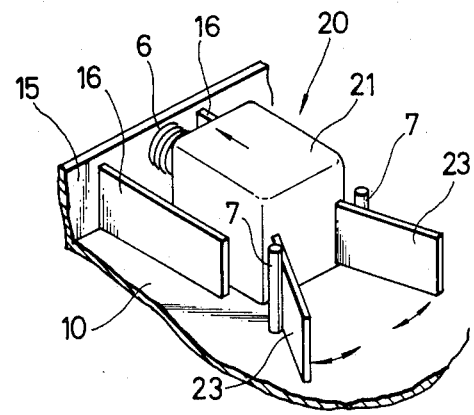
FIG. 1 is a partial perspective view showing the conventional brake member and its mounting structure.

Referring to the drawings, several embodiments according to the present invention will be described in detail.

Figure 3:
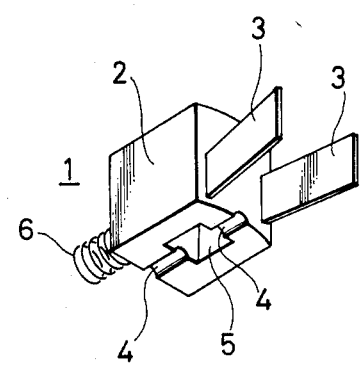
FIGS. 3 and 4 are perspective views showing a main portion of an embodiment according to the present invention.
Figure 4:
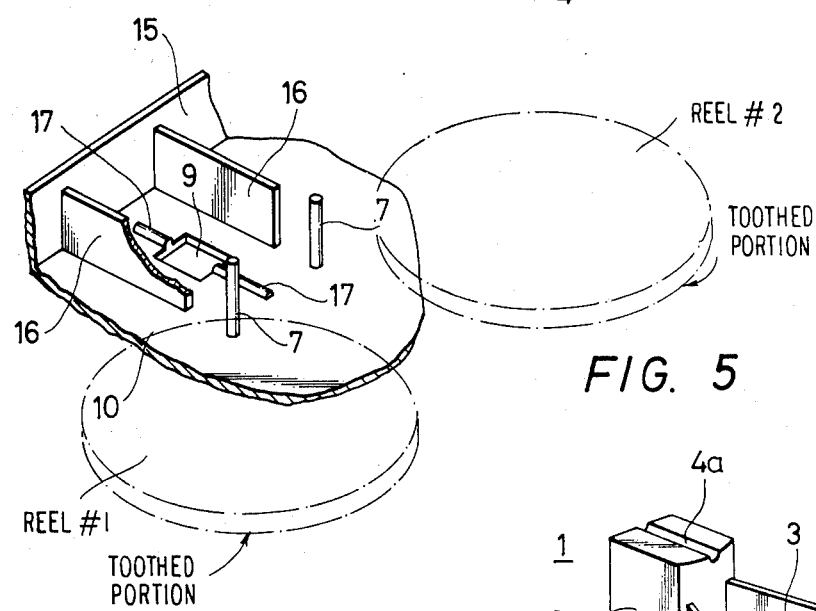

FIGS. 3 and 4 are perspective views showing a main portion of an embodiment according to the present invention. A brake member 1 shown in FIG. 3 is provided with a pair of elastic engaging pawls 3 disposed on a frontal wall surface of a quadrangular prism body 2 (called the block 2) of the brake member 1 such that the engaging pawls 3 are opened toward the front of the cassette at a predetermined angle. In the lower wall surface of the block 2, there are formed both a recess portion 5 similar to the conventional one, and a groove 4 extending in the front to rear direction (hereinafter, referred to as "transversal direction") of the cassette. The groove 4 is formed in the central position of the brake member so as to divide it into equal right and left parts.

In the cassette casing 10 in which the brake member 1 is arranged, similarly to the conventional case, there are provided, as shown in FIG. 4, a pair of partition walls 16, a brake releasing bar insertion hole 9 and a pair of choke pins 7. All the foregoing elements are similar to those found in FIGS. 1 and 2. Further, a guide rib 17 is formed at the edge portions of the insertion hole 9 so as to extend along the transversal direction of the cassette from the edges of the hole 9 toward the front and toward the rear of the cassette in a position coincident with a center line of the cassette casing 10. The vertical cross-section of the guide rib 17 may be, for example, semicircular, rectangular, triangular, or other shapes. The shape of the groove 4 formed in the brake member 1 is made to mate with that of the guide rib 17 so as to suppress the free movement of brake member 1 in the longitudinal direction of the cassette to thereby smooth the sliding displacement of the brake member 1.

The brake member 1 is made of plastic resin similar to the conventional one, for example, POM resin or ABS resin, having elasticity to a certain extent, and integrally formed by injection molding or the like.

Although the brake member 1 shown in FIG. 3 is mounted as shown in FIG. 4 substantially in the same manner as in the conventional cassette casing, the guide rib 17 is fitted into the groove 4 when the brake member is mounted.

Figure 2:
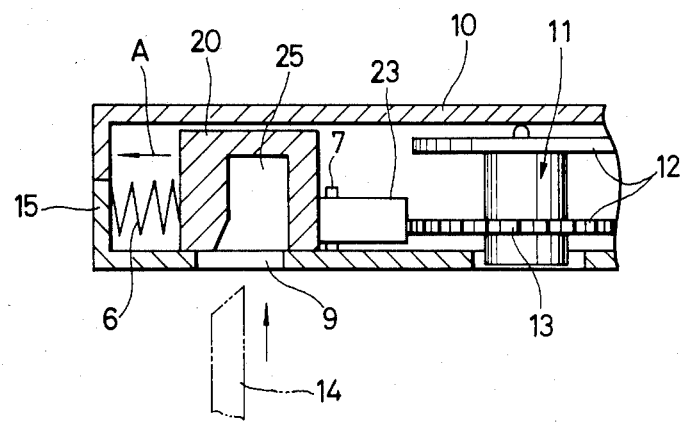
FIG. 2 is a partial cross-section, vertically cut in the front to rear direction, of the magnetic tape cassette having the brake member of FIG. 4 at the center portion of the cassette.

Being guided by the guide rib 17 in the displacement direction of the brake member 1 when it slides, the thus incorporated brake member 1 does not come into contact with the partition walls 16 and the movement of the brake member 1 in the longitudinal direction of the cassette is suppressed to thereby make the brake member 1 move smoothly. Furthermore, when the cassette is stored, that is, when the engaging pawls 3 are engaged with the respective tooth portions 13 of the tape reels 11 (as shown in FIG. 2), the brake member 1 is held by the fit between the groove 4 and each of the guide ribs 17 without being inclined in the longitudinal direction of the cassette so that the brake member 1 is prevented from moving from a proper position. Further, the brake member 1 hardly moves in the longitudinal direction of the cassette even in a brake-released state.

Figure 5:
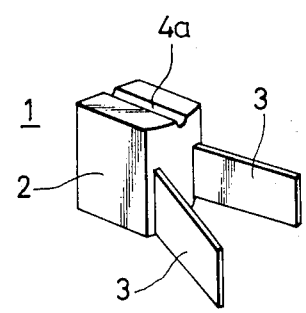
FIG. 5 is a perspective view showing a main portion of a modified embodiment of the present invention.

Although the groove 4 is formed in the block 2 in its lower wall surface adjacent the recess 4 and the guide rib 17 is formed in the cassette casing 10 on its lower inner surface in the foregoing embodiment, the present invention is not limited to this embodiment. For example, as shown in a brake member 1 of FIG. 5, a groove 4a may be provided in a block 2 at its upper wall surface. In this case, it is needless to say that a guide rib to be fitted in the groove 4a is provided in the cassette casing 10 on its upper inner surface although the guide rib is not illustrated in the drawing. Further, a brake member 1 may be arranged so as to have in combination both the arrangements of the brake members 1 shown in FIGS. 3 and 5, that is, to have grooves formed in both the upper and lower wall surfaces of the brake member 1.

Although the arrangement is made such that one groove is provided in the foregoing embodiments, the present invention is not limited to those embodiment, and the arrangement may be modified so as to provide a plurality of grooves, either above or below the block or both. Moreover, the same functions can be obtained in the case where, unlike in the foregoing embodiments, a groove is formed in the cassette casing and a guide is formed in the block. Therefore it is needless to say that this case is included in the scope of the concept of the present invention.

As described above, by means of the fit between the groove and the guide rib, not only is play eliminated from the movement of the brake member 1 when it is slid, but the brake member is maintained in position with no play by the fit between the groove and the guide rib even after the displacement has been completed. Accordingly, the brake member has superior sliding properties and it is possible to perform the locking and unlocking of the tape reels extremely accurately and precisely. Therefore, according to the present invention, it is possible to provide a magnetic tape cassette in which the risk of undesirable contact between the brake member and the tape reel as well as troubles such as jamming of the tape due to looseness in the winding of the tape during storage of the cassette can be prevented from occurring.

Particularly, the present invention is extremely effective in a magnetic tape cassette, for example, an 8 mm video cassette which is reduced in size as well as in weight, and in which a high accuracy is required.

What I claim is:

1. A tape cassete, comprising:
    a cassette case (10);
    two spaced tape reels (11) for winding a tape therearound, each of said reels having a tooth portion (13) formed on an outer peripheral edge of a flange thereon;
    a brake member (1) disposed intermediate said reels for reciprocable sliding movement within said cassette case in a first direction toward said reels and in a second direction away therefrom, said brake member having two engaging pawls (3) extending outwardly therefrom for individually engaging said tooth portions upon movement of said brake member in said first direction;
    at least one elongated groove (4) formed in one of a top or a bottom surface of said brake member and an upper or lower interior surface of said cassette case, respectively, and extending in said directions of sliding movement; and
    at least one guide rib (17) formed in and projecting outwardly from another of said top or said bottom surface of said brake member and said upper or lower interior surface, extending in said directions of sliding movement, and cooperable with said groove such that said brake member is restrained from lateral translation perpendicular to said directions of sliding movement to thereby maintain said engaging pawls in simultaneous engagement with said tooth portions.

2. A tape cassette as recited in claim 1, wherein said at least one groove is formed in said brake member.

3. A tape cassette as recited in claim 1, further comprising means for biasing said brake member so as to engage said pawls with said tooth portions;
a recess formed in said brake member;
a hole formed in said cassette case facing said recess whereby force opposite said first direction is appliable to said brake member and is appliable outside of said cassette case to overcome said biasing means and to disengage said pawls from said tooth portions.

4. A tape cassette as recited in claim 3, wherein said hole is formed in said interior surface.

5. A tape cassette as recited in claim 3, wherein said interior surface is other than an interior surface in which said hole is formed.

6. A tape cassette as recited in claim 1, wherein there are a plurality of grooves and a plurality of ribs fittable respectively into said grooves.

* * * * *